United States Patent
Lee et al.

(10) Patent No.: US 9,213,971 B2
(45) Date of Patent: Dec. 15, 2015

(54) METHOD AND SYSTEM FOR PROVIDING INFORMATION ON PRE-PURCHASE AND POST-PURCHASE ITEMS USING RFID AND COMPUTER-READABLE STORAGE MEDIA STORING PROGRAMS FOR EXECUTING THE METHOD

(75) Inventors: Dong Hoon Lee, Goyang-si (KR); Eun Young Choi, Seoul (KR); Il Jung Kim, Seoul (KR)

(73) Assignee: KOREA UNIVERSITY INDUSTRIAL & ACADEMIC COLLABORATION FOUNDATION, Seoul (KR)

( * ) Notice: Subject to any disclaimer, the term of this patent is extended or adjusted under 35 U.S.C. 154(b) by 1842 days.

(21) Appl. No.: 12/027,932

(22) Filed: Feb. 7, 2008

(65) Prior Publication Data

US 2008/0208753 A1     Aug. 28, 2008

(30) Foreign Application Priority Data

Feb. 28, 2007   (KR) .......................... 10-2007-0020602

(51) Int. Cl.
| | |
|---|---|
| G06Q 20/32 | (2012.01) |
| G06Q 20/04 | (2012.01) |
| G06Q 20/38 | (2012.01) |
| G06Q 30/02 | (2012.01) |
| G07G 1/00 | (2006.01) |
| H04L 9/32 | (2006.01) |

(52) U.S. Cl.
CPC .............. *G06Q 20/32* (2013.01); *G06Q 20/045* (2013.01); *G06Q 20/3278* (2013.01); *G06Q 20/3823* (2013.01); *G06Q 30/02* (2013.01); *G07G 1/009* (2013.01); *H04L 9/3263* (2013.01); *H04L 9/3271* (2013.01); *H04L 2209/56* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 7,388,481 B1 * | 6/2008 | Cahn .............................. | 340/505 |
| 2002/0026478 A1 * | 2/2002 | Rodgers et al. ............... | 709/205 |

(Continued)

*Primary Examiner* — Margaret Neubig
(74) *Attorney, Agent, or Firm* — Christie, Parker & Hale, LLP

(57) ABSTRACT

Pre-purchase and post-purchase item information provision methods and systems using an RFID technology and computer readable storage media storing programs for executing the methods are provided. A pre-purchase item information provision method for a radio frequency identification system according to the present invention includes transmitting, if a mobile reader is detected by a local server installed in a salesroom, a certificate containing information on a location of an object information service server and an authentication value to the mobile reader; transmitting, at the mobile reader, a query requesting an item ID to a tag attached to a target item; transmitting, at the tag, a item ID information generated by encrypting the item ID using the authentication value to the mobile reader; transmitting, at the mobile reader, the item ID information and the authentication value to the object information service server; and transmitting, at the object information service server, data retrieved in a database in correspondence to the item ID, the data being retrieved when the authentication value exists in the database. The item information provision method and system of the present invention can guarantee reliability of information on an item in the pre-purchase state and prevent the information from being eavesdropped in both the pre-purchase and post-purchase states. Also, the item information provision method and system can prevent the tag ID from being tracked, thereby protecting purchaser's privacy, preventing the tag from being forged, and improving computation efficiency.

12 Claims, 7 Drawing Sheets

(56) References Cited

U.S. PATENT DOCUMENTS

| | | | |
|---|---|---|---|
| 2002/0049644 A1* | 4/2002 | Kargman | 705/26 |
| 2003/0120745 A1* | 6/2003 | Katagishi et al. | 709/217 |
| 2006/0197651 A1* | 9/2006 | Lee et al. | 340/5.61 |
| 2007/0106897 A1* | 5/2007 | Kulakowski | 713/171 |
| 2009/0138710 A1* | 5/2009 | Minematsu | 713/170 |

* cited by examiner

METHOD AND SYSTEM FOR PROVIDING INFORMATION ON PRE-PURCHASE AND POST-PURCHASE ITEMS USING RFID AND COMPUTER-READABLE STORAGE MEDIA STORING PROGRAMS FOR EXECUTING THE METHOD

CROSS-REFERENCE TO RELATED APPLICATION

This application claims priority of Korean Patent Application Number 10-2007-0020602, filed on Feb. 28, 2007.

BACKGROUND OF THE INVENTION

1. Field of the Invention

The present invention relates to a Radio Frequency Identification (RFID) system and, in particular, to a method and system for providing information on pre-purchase or post-purchase items using an RFID technology and computer readable storage media storing programs for executing the method.

2. Description of the Related Art

Radio Frequency Identification (RFID) is an automatic identification technology which relies on storing and remotely retrieving data using devices call RFID tags. Since the RFID system enables quickly reading the data from the RFID tags without physical contact it is often envisioned as a replacement for barcode identification systems. Recently, RFID system is partially used for physical distribution, traffic control, animal control, etc.

As a similar identification system, 2D barcode system is used for mobile ticketing services. However, the utilization of 2D barcode is limited in its very short recognition distance.

In the RFID system, an RFID reader transmits a query to an RFID tag and the RFID tag transmits its information in response to the query. The information received from the RFID tag is transmitted to a database. In such a manner, a service provider can simply obtain information of the tag carried by a customer and provide the customer with a customer-specific service on the basis of the information. However, since the RFID tag and RFID reader communicate with each other through an insecure channel, the information is vulnerable to attackers, this may include private information such as credit information, purchase patterns, and health condition. Also, the eavesdropped information may be used for tracking the user's location in illegal ways.

In a case of using the RFID tags for providing product information, the information embedded in the tags of items on shelves should be readable by all customers mobile readers, except after being purchased.

However, the conventional RFID system has a drawback in that the information embedded in the RFID tag is read by any mobile reader even after the item attached the RFID tag has been purchased, whereby the purchase item list can be eavesdropped and the purchaser can be traced by another person, resulting in infringement of customer's privacy. Also, since the electronic product code (EPC) is transferred without any security authentication process, an attacker can eavesdrop on the EPC for forgery.

SUMMARY OF THE INVENTION

The present invention has been made in an effort to solve the above problems, and it is an object of the present invention to provide an RFID-based pre-purchase item information provision method that is capable of guaranteeing reliability of information on items before selling, preventing the tags from forgery, and improving computation efficiency.

It is another object of the present invention to provide an RFID-based post-purchase item information provision method that is capable of protecting a purchaser's privacy by preventing the information from being eavesdropped and the purchaser from being tracked by item IDs, protecting forgery of the tags, and improving computation efficiency.

It is another object of the present invention to provide a computer readable storage media storing programs executing an RFID-based pre-purchase and post-purchase items information provision method.

It is another object of the present invention to provide an RFID-based pre-purchase item information provision system.

It is another object of the present invention to provide an RFID-based post-purchase item information provision system.

In accordance with an aspect of the present invention, the above and other objects are accomplished by a pre-purchase item information provision method for a radio frequency identification system. The pre-purchase item information provision method includes transmitting, if a mobile reader is detected by a local server installed in a salesroom, a certificate containing information on a location of an object information service server and an authentication value to the mobile reader; transmitting, from the mobile reader, a query requesting an item ID to a tag attached to a target item; transmitting, from the tag, item ID information generated by encrypting the item ID using the authentication value to the mobile reader; transmitting, from the mobile reader, the item ID information and the authentication value to the object information service server; and transmitting, from the object information service server, data retrieved from a database corresponding to the item ID, the data being retrieved when the authentication value exists in the database.

In accordance with another aspect of the present invention, the above and the other objects are accomplished by a pre-purchase item information display method for a mobile reader in a radio frequency identification system. The pre-purchase item information display method includes receiving, at the mobile reader, a certificate containing information on a location of an object information service server and authentication value from a local server installed in a salesroom; requesting a tag attached to an item for an item ID embedded in the tag; receiving item ID information generated by encrypting the item ID using the authentication value from the tag; transmitting the item ID information and the authentication value to the object information service server; and receiving data corresponding to the item ID from the object information service server.

In accordance with another aspect of the present invention, the above and other objects are accomplished by a post-purchase item information provision method for a radio frequency identification system. The post-purchase item information provision method includes receiving, at a mobile reader, item keys of purchased items from an object information service server; transmitting a query containing a first random value generated by the mobile reader to a tag attached to the purchased item; receiving a first value and a second value from the tag, the first value being obtained by encrypting an item ID with a second random value generated by the tag, the second value being obtained by encrypting the second random value with the item key; extracting the second random value from the second value using the item key and extracting the item IDs from the first value using the second random value; transmitting the item ID formatted in electronic product code (EPC) among extracted item IDs to the object information service server; and receiving data corresponding to the item ID from the object information service server.

In accordance with another aspect of the present invention, the above and other objects are accomplished by a post-purchase item information provision method for a radio frequency identification system. The post-purchase item information provision method includes receiving, at a mobile reader, item keys of purchased items from an object information service server; transmitting a query containing a first random value to a tag attached to an item, the first random value being generated by the mobile reader; receiving a first value and a second value from the tag, the first value being obtained by encrypting the item ID with a second random value, the second value being obtained by encrypting the second random value with the item key embedded in the tag; extracting the second random value from the second value using the item key and extracting the item IDs from the first value using the second random value; transmitting the item ID formatted in electronic product code (EPC) among extracted item IDs to the object information service server; and receiving data corresponding to the item ID from the object information service server.

In accordance with another aspect of the present invention, the above and other objects are a pre-purchase item information provision system using a radio frequency identification system. The pre-purchase item information provision system includes a mobile reader which receives a certificate containing information on a location of an object information service server and an authentication value from a local server installed in a salesroom, transmits a query for requesting item ID to a tag attached to a specific item in response to a user command, receives item ID information generated by encrypting the item ID using the authentication value from the tag, and transmits the item ID information and the authentication value to the object information service server; a tag which receives the query from the mobile reader and transmits item ID information generated by encrypting the item ID using the authentication value; an object information service server which searches a database for the authentication value, retrieves, if the authentication value is found, data corresponding to item ID from the database, and transmits the data to the mobile reader; and a local server storing certificate containing the information of the object information service server and authentication value.

In accordance with another aspect of the present invention, the above and other objects are accomplished by a post-purchase item information provision system using a radio frequency identification system. The post-purchase item information provision system includes a tag which generates a second random value, generates a first value by encrypting an item ID with the second random value, generates a second value by encrypting the second random value with a tag key, and transmits the first and second values to a mobile reader; a mobile reader which receives item keys of purchased items from an object information service server, transmits a query containing a first random value generated by the mobile reader to a tag attached to the purchased item, extracts the second random value from the second value using the item key, and extracts the item IDs from the first value using the second random value; and an object information service server which transmits, when an item ID formatted in electronic product code (EPC) is received, data corresponding to the item ID to the mobile reader.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

The present invention allows a customer to obtain reliable information on items before and after purchasing and guarantees customer's privacy in a mobile RFID system environment.

In mobile RFID system environment constructed by applying the present invention, the customer can check information on pre-purchase and post-purchase items. Before purchasing an item, the customer can check whether the item is an authentic one or not using an authentication certificate issued by the manufacturer. Also, the access to the information on the purchased item is restricted to only the purchaser, resulting in protection of customer's privacy.

Figure 1A:
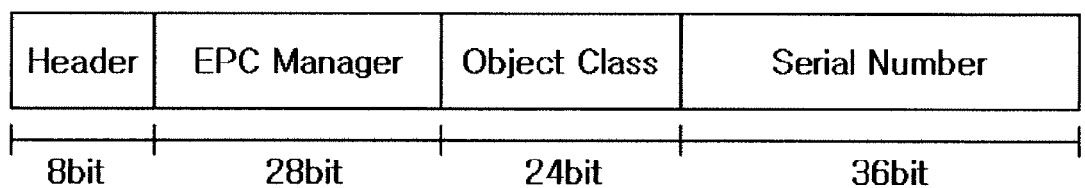
FIG. 1a is a diagram illustrating an electronic product code (EPC) format used in a RFID system according to an exemplary embodiment of the present invention.

In the mobile RFID system, unique information of the tag is stored in an Electronic Product Code (EPC) format. The EPC is composed of a Header, an EPC manager, an Object Class, and a Serial number as shown in FIG. 1a.

Table 1 shows the definitions of the fields of the EPC.

TABLE 1

| Field | Description |
| --- | --- |
| Header (8 bits) | It identifies the type and length of data. |
| EPC Manager (28 bits) | It identifies entity such as an organization or company responsible for managing Object Class and Serial Number. |
| Object Class (24 bits) | It identifies a class or unit of item. |
| Serial Number (36 bits) | It identifies a unique number assigned to each item. |

Table 2 shows definitions of symbols used in the following descriptions.

TABLE 2

| Symbol | Definition |
| --- | --- |
| $request_p$ | A signal transmitted by a mobile reader for requesting ID of a pre-purchase item in a salesroom. |
| $request_c$ | A signal transmitted by a mobile reader for requesting PID and KID of a post-purchase item. |
| ID | EPC of a tag |
| K | Key value of a tag |
| $K_j$ | Keys stored in a mobile reader |
| $r_i$ | A random value generated by a PRNG generator of the mobile reader |
| $r_T$ | A random value generated by a tag |
| hK( ) | Keyed hash function |
| CerTficate($C_i$) | Certificate for authenticating genuine information of item, which includes authentication value (C) and location information of a server having information corresponding to EPC. |
| $list_c$ | Authentication value list |
| $\oplus$ | Exclusive-OR |

In table 2, i and j are random indexes. In the following, NID means an encrypted ID of a pre-purchase item, and PID means an encrypted ID of a purchased item.

Exemplary embodiments of the present invention are described with reference to the accompanying drawings in detail. Although the invention is described in detail with reference to specific embodiments thereof, it will be understood that variations which are functionally equivalent are within the scope of this invention. The same reference numbers are used throughout the drawings to refer to the same or like parts. Detailed descriptions of well-known functions and structures incorporated herein may be omitted to avoid obscuring the subject matter of the present invention.

Figure 1B:
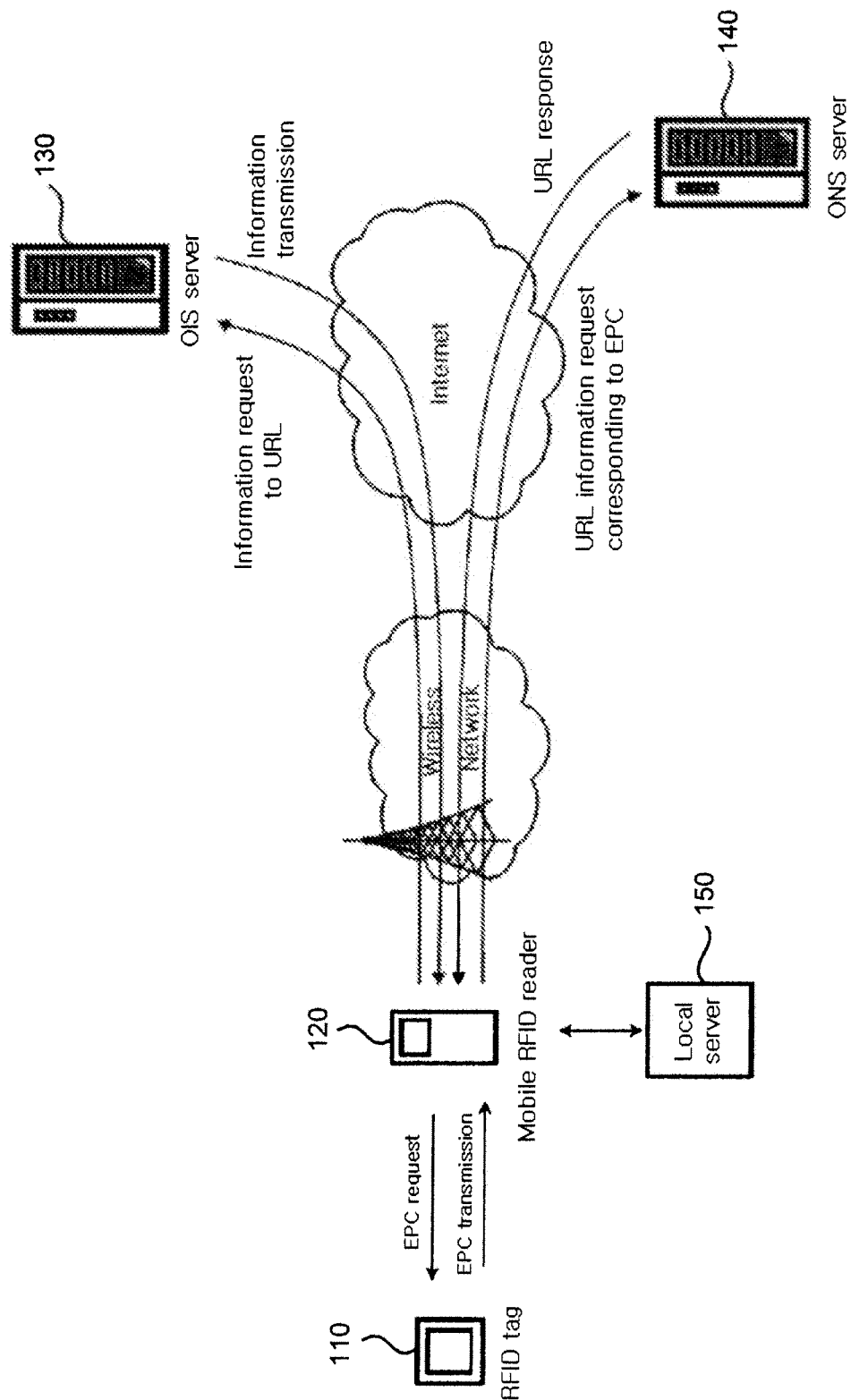
FIG. 1b is a diagram illustrating a pre-purchase and post-purchase item information provision system using RFID technique according to an exemplary embodiment of the present invention.

FIG. 1b is a diagram illustrating a pre-purchase and post-purchase item information provision system using RFID technique according to an exemplary embodiment of the present invention. In FIG. 1b, an RFID tag 110 receives a query from a mobile reader 120 and transmits an EPC of an item to which it is attached in response to the query. The RFID tag 110 includes an antenna for RF communication and a microchip for storing and processing information. RFID tags are classified into active RFID tags and passive RFID tags.

Passive RFID tags require no internal power source and are only active when a reader is nearby to power them. However, the passive RFID tags are limited in terms of complicated calculations. The passive RFID tags are semi-permanent and cheap relative to the active RFID tags since no internal battery is required. In this embodiment, and EPGglobal Class 1 Generation 2 tag supporting a Pseudo Random Number Generator (PRNG) is used. The RFID tag can be configured to generate pseudo-random numbers.

Active RFID tags, unlike passive RFID tags, have their own internal power source, which is used to power the integrated circuits and broadcast the signals to the reader. The active RFID tags have relatively long radio range, however, the active RFID tags are expensive and have a short shelf life.

The mobile RFID reader 120 can be embedded a mobile device. The mobile RFID reader 120 can transmit a query, detect data transmitted by the RFID tag 110 and rewrite new information on the RFID tag.

An Object Information Service (OIS) server 130 stores content matched to the EPC of the RFID tag and provides the content in response to a request.

An Object Naming System (ONS) server 140 operates as a Domain Name Service (DNS) server such that it provides a Uniform Resource Location (URL) of the server having the EPC information.

An operation of the above structured system in association with pre-purchase item information provision is described hereinafter.

Upon entering a salesroom, the mobile reader 120 receives a certificate containing location information of the OIS server 130 and an authentication value from a local server 150. If a user requests information on a specific item on a shelf, the mobile reader 120 requests an item ID to the RFID tag 110 attached to the item. If the item ID is received from the RFID tag 110, the mobile reader 120 transmits an encrypted item ID and authentication value to the OIS server 130 which is indicated by the location information contained in the certificate.

The RFID tag 110 is attached to the item. If an item ID request is received from the mobile reader 120, the RFID tag 110 encrypts the item ID with the authentication value received from the mobile reader 120 and transmits the encrypted item ID to the mobile reader 120.

The OIS server 130 determines whether the authentication value received from the mobile reader 120 exists in a database and, if the authentication value exists, the OIS server 130 retrieves data corresponding to the authentication value and transmits the data to the mobile reader 120.

The local server 150 stores the certificate containing the location information of the OIS server 130 and the authentication value.

An operation of the above structured system in association with post-purchase item information provision is described hereinafter.

As described above, the RFID tag 110 is attached to an item. The RFID tag 110 generates a second pseudo random number and a first value by encrypting the second pseudo random number. The RFID tag 110 also encrypts a second value with a tag key and transmits the encryptions of the first and second values to the mobile reader 120.

If the item to which the RFID tag 110 is attached is purchased by a customer, the mobile reader 120 receives the key of the item from the OIS server 130. The mobile reader 120 can use the keys received from the OIS server 130 for generating a purchased item list. If the purchased item information request is detected, the mobile reader 120 transmits a data request signal to the RFID tag 110 together with the first pseudo random number. Next, the mobile reader 120 receives the keys for storing the first and second values from the OIS server 130, extracts the second pseudo random number form the second value using the keys, and extracts the item ID from the first value with the second pseudo random number.

Preferably, the mobile reader 120 is configured such that the mobile reader 120 transmits the ID formatted in the EPC structure among the extracted IDs to the ONS server 140 and requests data on the EPC to the OIS server 130 which is notified by using the URL and checked ID received from the ONS server 140. At this time, the ONS server 140 identifies the item ID and transmits the URL of the OIS server having the data corresponding to the item ID to the mobile reader 120.

If the item ID formatted in EPC structure exists among the extracted IDs, the OIS server 130 transmits the data corresponding to the item ID to the mobile reader 120.

As described above, the information on an item is provided by the mobile reader in different manners in pre-purchase state and post-purchase state.

Figure 2:
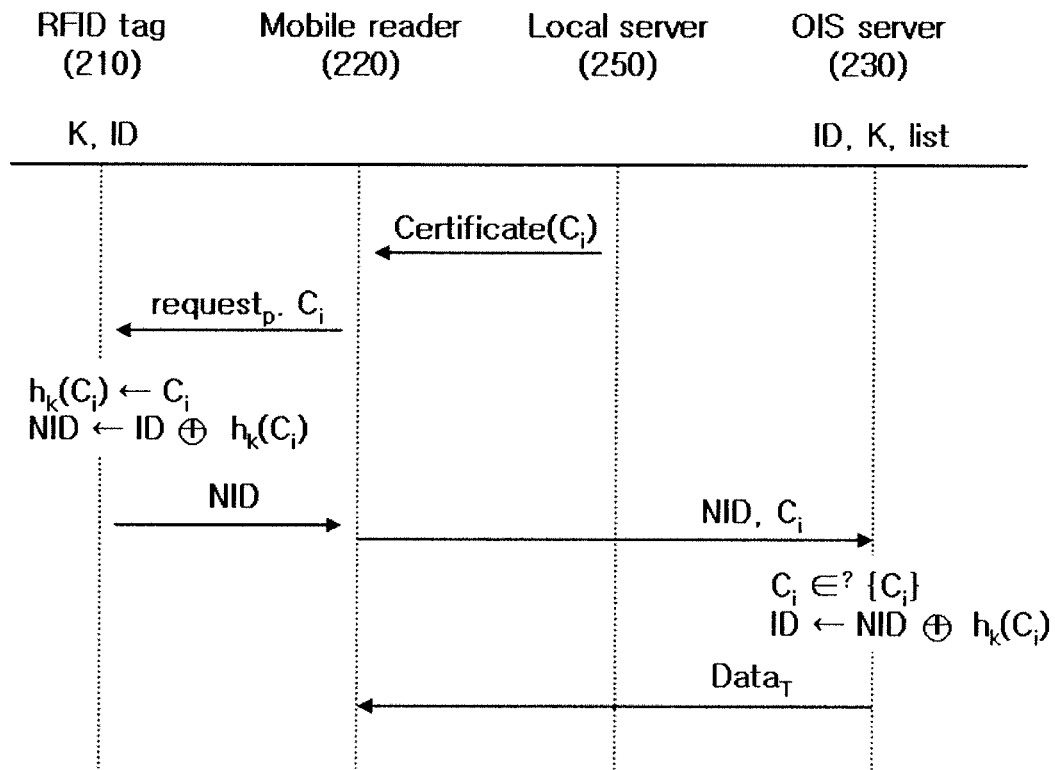
FIG. 2 is a signaling diagram illustrating signal flows of a system for providing information on an item in a pre-purchase state according to an exemplary embodiment of the present invention.

FIG. 2 is a signaling diagram illustrating signal flows of a system for providing information on an item in a pre-purchase state according to an exemplary embodiment of the present invention.

The local server 250 of each salesroom stores the certificates having respective authentication values assigned to the items on shelves. The certificates are received from the OIS server 230 in advance.

If a customer carrying the mobile reader 220 enters the salesroom, the mobile reader 220 receives a certificate CerTficate($C_i$) containing an OIS server location information and an authentication value $C_i$ from the local server 250.

Next, the mobile reader 220 transmits a query (request$_p$, $C_i$) to a RFID tag 210 attached to an item for requesting the item ID.

If the query (request$_p$, $C_i$) is detected, the RFID tag 210 generates a keyed hash function $h_K(C_i)$ and transmits an NID obtained by performing an exclusive-OR (XOR) operation on the item ID and be keyed hash $h_K(C_i)$, to the mobile reader.

Upon receiving the NID, the mobile reader 220 transmits the NID and $C_i$ to the OIS server 230 of which location is obtained from the certificate CerTficate ($C_i$).

Finally, the OIS server 230 obtains the item ID using the key value K and the NID and $C_i$ received from the mobile reader 220. Specifically, the OIS server 230 obtains the item ID by performing an XOR operation on the NID and the keyed hash $h_K(C_i)$. The OIS server 230 retrieves data Data$_T$ corresponding to the recovered item ID from a database and determines whether the $C_i$ received from the mobile reader 220 belongs to an authentication value list listC(={C}). If $C_i$ belongs to listC(={C}), the OIS server 230 transmits the data Data$_T$ corresponding to the EPC of the RFID tag 210 to the mobile reader 220.

Accordingly, the mobile reader 220 displays Data$_T$ received from the OIS server 230 as the item information.

Figure 3:
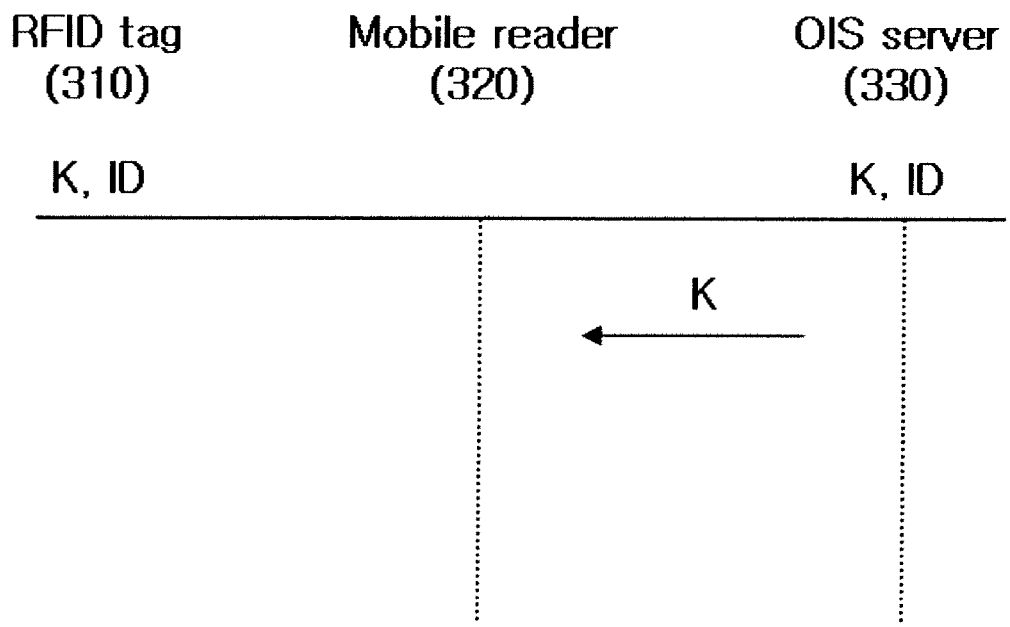
FIG. 3 is a signaling diagram illustrating signal flows for an initial setting of a mobile reader of the system of FIG. 2.

FIG. 3 is a signaling diagram illustrating signal flows for an initial setting of a mobile reader of the system of FIG. 2.

In FIG. 3, the mobile reader 320 and the OIS server 330 communicate with each other through a typical secure wireless communication link. The customer purchasing the item receives a key K from the OIS server 330 by means of the mobile reader 320 through the secure wireless communication link. The key K is used for reading out the information on the purchase item. By using the key K received from the OIS server 330, the customer's privacy can be protected.

Figure 4:
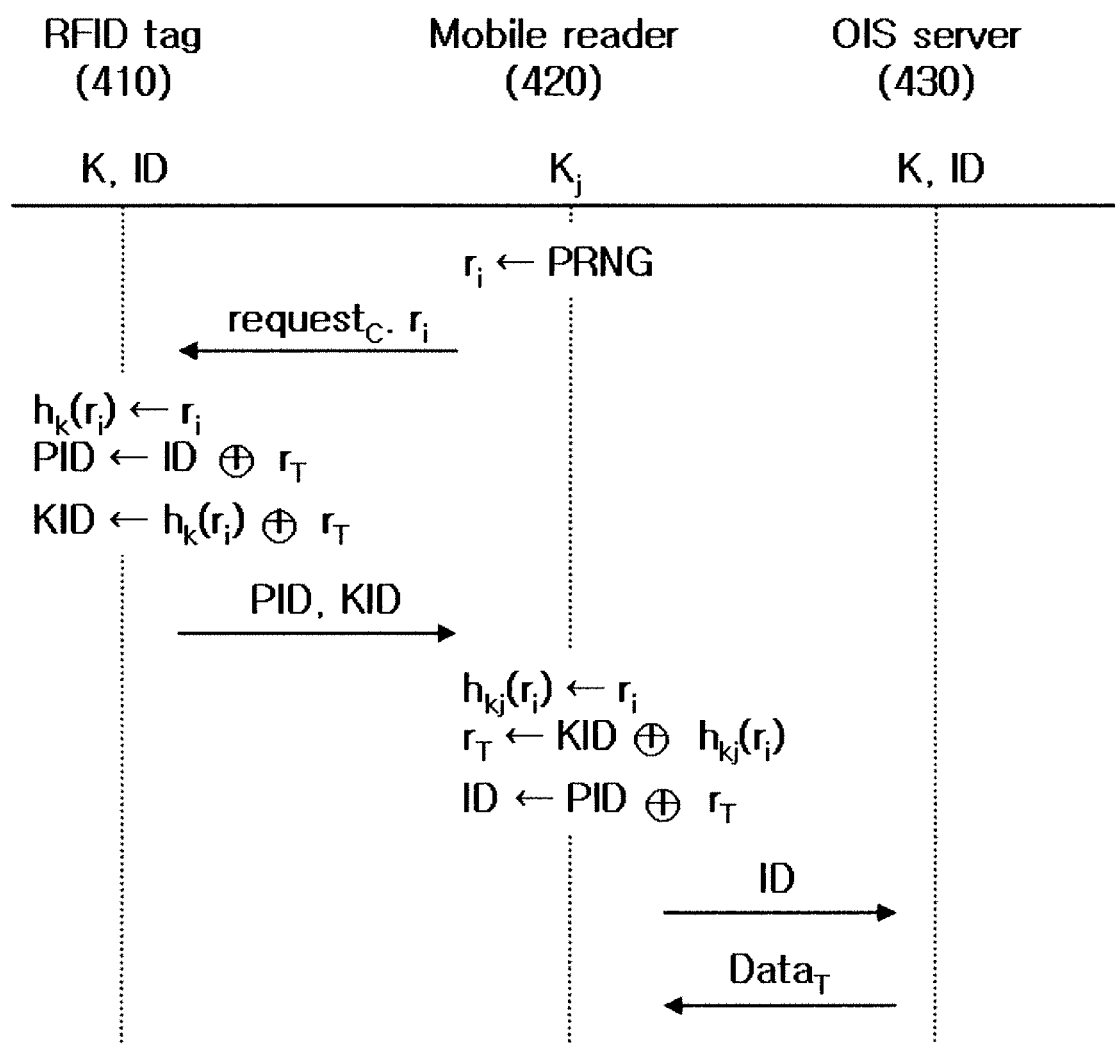
FIG. 4 is a signaling diagram illustrating signal flows of a system for providing information on an item in a post-purchase state according to an exemplary embodiment of the present invention.

FIG. 4 is a signaling diagram illustrating signal flows of a system for providing information on an item in a post-purchase state according to an exemplary embodiment of the present invention.

First, the mobile reader 420 generates a first pseudo random number $r_i$ using a Pseudo Random Number Generator (PRNG) and transmits a query (request$_r$, $r_i$) for requesting data on the purchased item.

If the query (request$_r$, $r_i$) is detected, the RFID tag 410 generates a keyed hash function $h_K(r_i)$ using the first pseudo random number $r_i$ and the key K. Next, the RFID tag 410 generates a second pseudo random number $r_T$ and, in turn, a PID and a KID using the $r_T$. The PID and KID are transmitted to the mobile reader 420.

If the PID and KID are received, the mobile reader 420 extracts the second pseudo random number $r_T$ from the KID using all the keys ($K_j$) and, in turn, extracts the item IDs of the RFID tag 410 from the PID using the $r_T$. Among the item IDs, ones formatted in the EPC structure are transmitted to the OIS server 430.

An ONS server (not shown) transmits an URL of the OIS server 430 storing the data corresponding to the authentication ID, i.e. genuine item ID, to the mobile reader 420.

Next, the mobile reader 420 requests the data on the EPC to the OIS server 430 identified by the URL provided by the ONS server.

Finally, the OIS server 430 transmits the data Data$_T$ corresponding to the EPC to the mobile reader 420.

Figure 5:
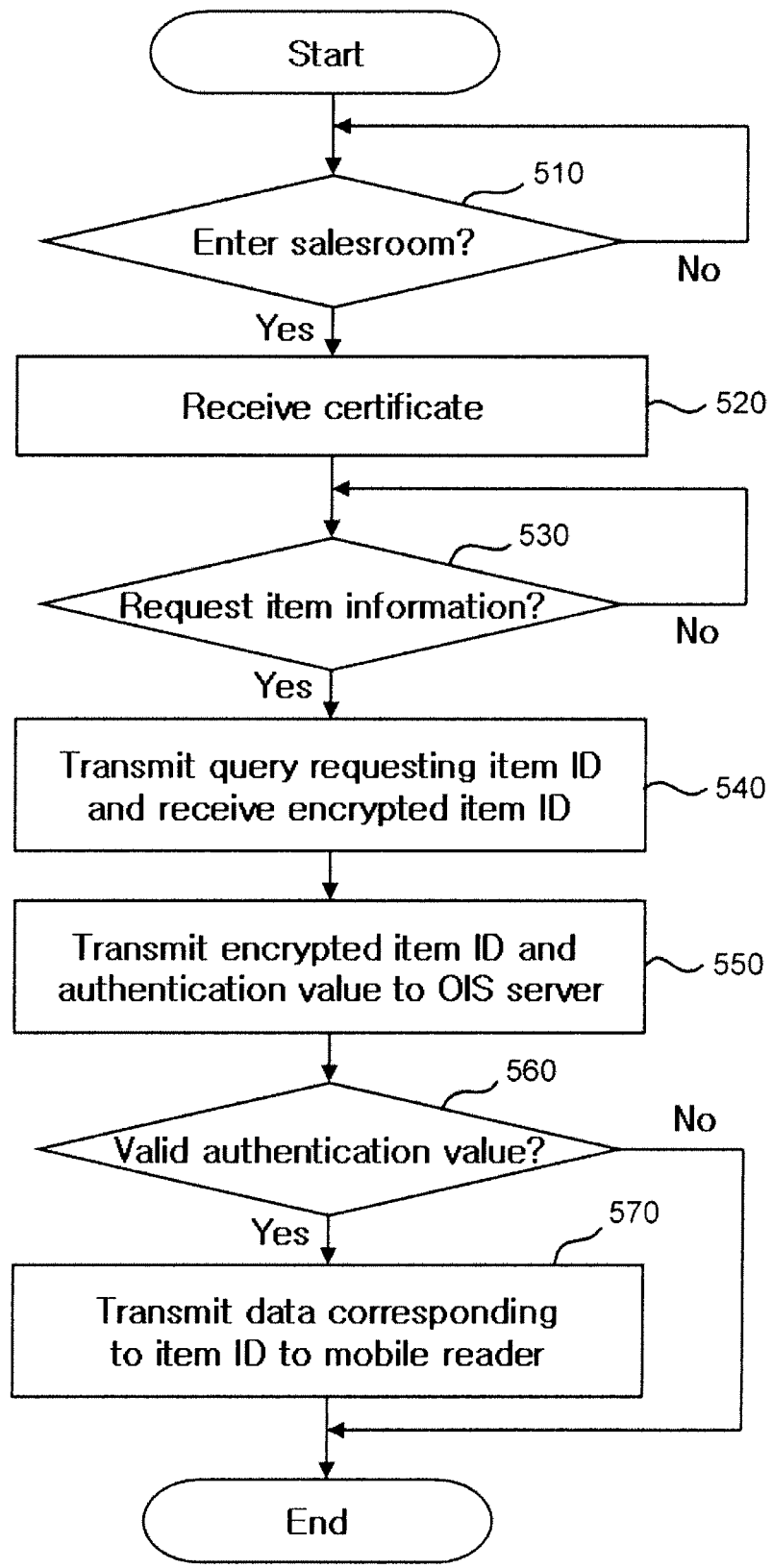
FIG. 5 is a flowchart illustrating a pre-purchase item information provision method using an RFID system according to an exemplary embodiment of the present invention.

FIG. 5 is a flowchart illustrating a pre-purchase item information provision method using an RFID system according to an exemplary embodiment of the present invention.

Referring to FIG. 5, a mobile reader carried by a customer monitors so as to detect its entrance to a salesroom at step 510. If its entrance to a sales room is detected, the mobile reader receives a certificate containing information on the location of an OIS server and an authentication value from a local server installed in the salesroom at step 520. Before entering the salesroom, the mobile reader stays in a standby state.

After receiving the certificate, the mobile reader determines whether an item information request signal is detected at step 530. The item information request signal can be generated by a button manipulation or by moving the mobile reader toward a target item having an RFID tag. If an item information request signal is detected, the mobile reader transmits a query requesting ID of the target item and receives an item ID encrypted by the authentication value from the RFID tag at step 540 and, otherwise, maintains a standby state.

Next, the mobile reader transmits the encrypted item ID and authentication value to the OIS server at step 550. At this time, the OIS server is identified by the location information contained in the certificate.

Upon receiving the encrypted item ID and authentication value, the OIS server searches a database for the authentication value at step 560.

If the authentication value is found, the OIS server retrieves data corresponding to item ID from the database and transmits the data to the mobile reader at step 570 and, otherwise, ends the procedure.

Figure 6:
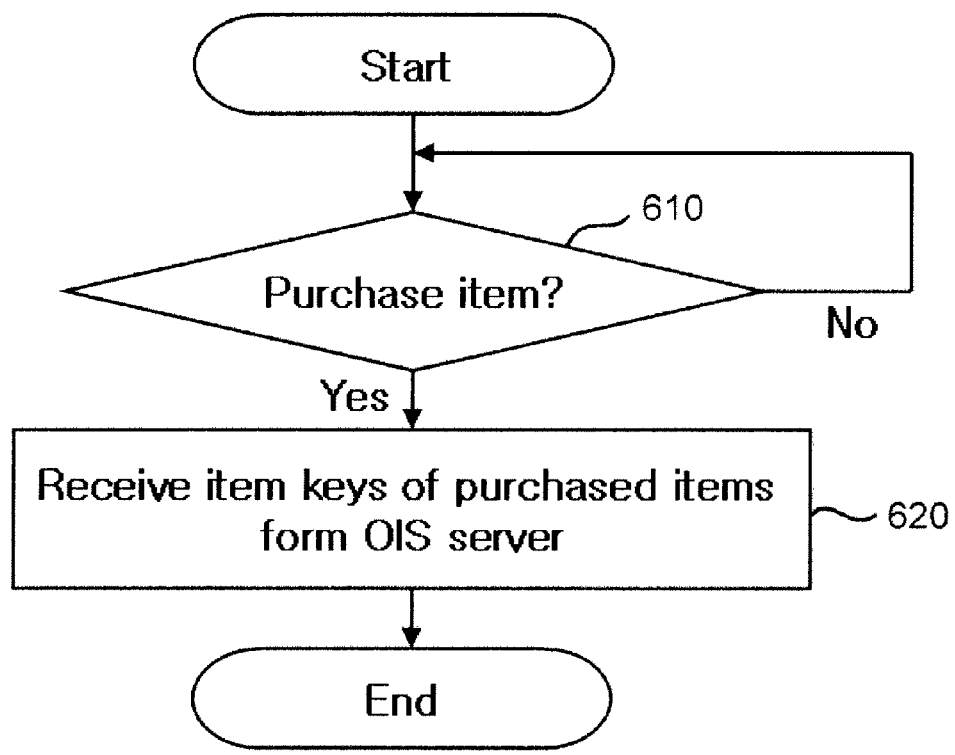
FIG. 6 is a flowchart illustrating an initial setting procedure for providing purchased item information of the item information provision method according to an exemplary embodiment of the present invention.

FIG. 6 is a flowchart illustrating an initial setting procedure for providing purchased item information of the item information provision method according to an exemplary embodiment of the present invention.

Referring to FIG. 6, the mobile reader determines whether a specific item is purchased at step 610. If no item is purchased, the mobile reader stays in a standby state.

If it is determined that an item is purchased, the mobile reader receives a key of the purchased item from an OIS server at step 620. In this manner, the mobile reader collects the purchased item keys for generating a purchased item list.

Figure 7:
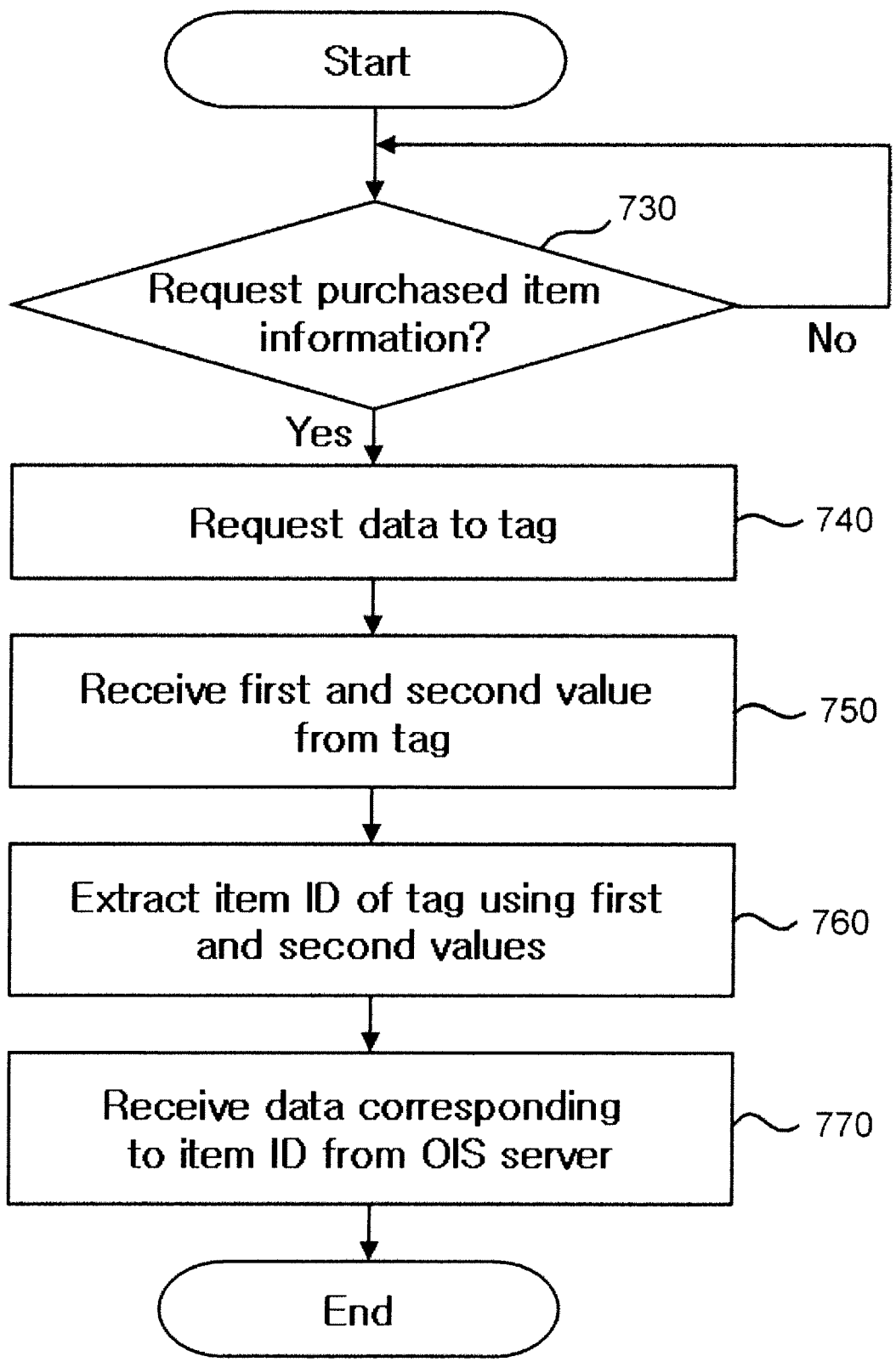
FIG. 7 is a flowchart illustrating a post-purchase item information provision method using an RFID system according to an exemplary embodiment of the present invention.

FIG. 7 is a flowchart illustrating a post-purchase item information provision method using an RFID system according to an exemplary embodiment of the present invention.

Referring to FIG. 7, the mobile reader monitors so as to detect a purchased item information request command at step 730. The purchased item information request command is generated by a key manipulation of the user.

If a purchased item information request command is detected, the mobile reader transmits a query requesting data on the purchased item at step 740. The query contains a first pseudo random number generated by the mobile reader.

Next, the mobile reader receives a first and second values from the RFID tag attached to the purchased item at step 750. The first value is generated by encrypting the item ID using a second pseudo random number and the second value is generated by encrypting the second pseudo random number using a tag key. The second pseudo random number is generated by the RFID tag.

Upon receiving the first and second values, the mobile reader extracts the second pseudo random number from the second value using the tag keys stored within the mobile reader and extracts the item ID from the first value using the second pseudo random number at step 760.

Finally, the mobile reader transmits one of the extracted item IDs which is formatted in EPC structure to the OIS server and receives the data corresponding to the item ID from the OIS server at step 770. Preferably, the post-purchase item information provision method includes a step in which the mobile reader displays purchased item information obtained by processing the data received from the OIS server on a screen of the mobile reader.

The item information provision method of the present invention allows the customer to obtain information on an item using a certificate issued by the item manufacturer before and after purchase, thereby providing reliable information on the item and protecting a purchaser's privacy, efficiently.

The item information provision method of the present invention is advantageous in providing reliable item information before purchasing it. In the item information provision system of the present invention, a local server installed in the salesroom stores the certificates issued by the item manufacturer and the local server provides the mobile reader with the certificates. The mobile reader can obtain the information on the item using the authentication value ($C_i$) and the location information of a server having item information received from the local server, resulting in improvement of reliability of the item information The item information provision method of the present invention is advantageous in protection against information eavesdropping. In the item information provision system of the present invention, the RFID tag transmits a random value obtained by encrypting the item ID (EPC) in response to a query transmitted by the mobile reader. Before the item is purchased, the item ID is encrypted by a hash function of an authentication value so as to be transmitted in the form of NID. Since the item ID of the RFID tag is transmitted in the form of NID encrypted by a hash function of an authentication value before being purchased and in the form of PID encrypted by a random value generated by the mobile reader and a keyed hash function, it results in protection of eavesdropping on the item ID and other information.

The item information provision method of the present invention is advantageous in protection against a purchaser's position tracking. This characteristic should be essential for an RFID system. In the item information provision system of the present invention, the purchased item is managed by the mobile reader with a unique key received from the system. Since the RFID tag transmits different value (PID, KID) encrypted with a unique key of the RFID tag and a keyed hash function, a person who doesn't know the key cannot obtain the item ID embedded in the RFID tag, resulting in preventing the customer from being tracked.

In the conventional RFID system, the code information embedded in the RFID tag is transmitted to the reader, whereby user privacy is likely to be infringed by tracking the eavesdropped code information. Also, since the conventional RFID system uses a policy server, the system security can be seriously threatened by attacks on the policy server. In the RFID system of the present invention, the unique code of the RFID tag is concealed by a random value such that it is difficult for a person to eavesdrop on the unique code, thereby improving user's privacy without an external server.

Unlike the conventional RFID system, the RFID system of the present invention uses an RFID reader embedded in the user's own mobile device, thereby efficiently protecting user privacy without an additional device. Also, the RFID system of the present invention allows the user to manage information on the purchased items without support of an external server, resulting in minimization of information leakage.

The item information provision method of the present invention is advantageous in protection against forgery. In the item information provision system of the present invention, the item ID of the purchased item can be obtained only with a tag key (K) stored within the mobile reader, thereby avoiding a third party's forgery of the item ID. Although an attacker eavesdrops on the information (PID or KID) between the mobile reader and the RFID tag with spoofing or retransmission attacks, it is impossible for the attacker to know the keyed hash function $h_K(r_i)$ of a random value which changes every session without the unique tag key (K), resulting in robust security of tag information.

In the conventional RFID system using a MARP (Mobile Agent for RFID Privacy) scheme, a proxy is used for protecting user privacy and security. Such RFID system solves the privacy infringement and security problems by exchanging random values between the tag and mobile (MRAP), between the mobile (MARP) and reader, and between the reader and database.

However, the MARP-based RFID system requires the proxy as an additional element and should monitor all communications between the tag and reader. In order to guarantee secure communication, a public key center is additionally required for managing the keys of the reader, tag, server, and proxy. In the RFID system of the present invention, the mobile device acts as the RFID reader such that no additional device or facility such as public center and external server is needed while efficiently protecting the user privacy and security.

Table 3 is an efficiency comparison result between the conventional MARP-based RFID system and the RFID system of the present invention.

TABLE 3

| Protocol | | MARP scheme | Present invention |
|---|---|---|---|
| Storage space | Tag | 3I | 2I |
| | Mobile reader | 7I | 1I |
| | database | 5I | 2I |
| Computation amount | Tag | 2H + 3X | 1H + 1X(pre-purchase) |
| | | | 1H + 2X(post-purchase) |
| | Mobile reader | (3E + 1D + 2V + 2S +1H + 1X) * M | —(pre-purchase) |
| | | | (1H + 2X) * N(post-purchase) |
| | database | 1E + 3D + 2V + 1S + 2H + 1X | 1H + 1X(pre-purchase) |
| | | | —(post-purchase) |

In table 3, I denotes an output length of a hash function or a length of the key or the ID, H denotes a hash operation, X denotes XOR bit operation, E denotes a encryption operation, D denotes a decoding operation, V denotes a signature verification operation, S denotes a signature operation, M denotes a number of tags in a MARP detectable range, N denotes a number of keys possessed by the mobile reader, and "-" denotes no consideration.

As shown in table 3, the RFID system of the present invention is superior to the MARP-based RFID system in terms of efficiency.

Preferably, the present invention provides a computer readable storage media storing programs for executing a pre-purchase item information provision method using RFID system.

Preferably, the present invention provides a computer readable storage media storing programs for executing the post-purchase item information provision method using RFID system.

The item information provision method of the present invention can be executed in the form of software. When the item information provision method is executed in the form of software, the software includes code segments for executing operations for implementing the information provision method. The programs and code segments can be stored in a processor-readable storage media and transmitted in the form of computer data signals carried by carrier waves.

The computer readable storage media include all kinds of recording devices that can store data in a computer-readable format. The computer readable storage media include Read Only Memory (ROM), Compact Disk ROM (CD-ROM), Digital Video Disc ROM (DVD±ROM), DVD-RAM, magnetic tape, floppy disk, hard disk, and optical data storage device. The computer readable storage media can be distributed in a distributed computer network and the computer readable codes are stored and executed in a distributed computing manner.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the item information provision method and system of the present invention can guarantee reliability of information on an item in the pre-purchase state and prevent the information from being eavesdropped in both the pre-purchase and post-purchase states. Also, the item information provision method and system can prevent the tag ID from being tracked, thereby protecting a purchaser's privacy, preventing the tag from being forged, and improving computation efficiency.

What is claimed is:

1. A pre-purchase item information provision method for a radio frequency identification system, comprising:
    transmitting to a mobile reader by a local server installed in a salesroom, a certificate containing information on a location of an object information service server and an authentication value, in response to the mobile reader being detected by the local server;
    transmitting, by the mobile reader, a query requesting an item ID uniquely identifying the target item, the item ID being stored in a tag attached to a target item, the query including the authentication value;
    encrypting, by the tag, the item ID based on the authentication value transmitted in the query;
    transmitting, by the tag, the encrypted item ID to the mobile reader;
    transmitting to the object information service server, by the mobile reader, based on the location information in the certificate, the encrypted item ID and the authentication value;
    determining, by the object information service server, whether the authentication value transmitted by the mobile reader exists in a database accessible to the object information service server;
    retrieving, by the object information service server, data associated with the target item in response to determining that the authentication value exists in the database;
    transmitting, by the object information service server, the data retrieved from the database to the mobile reader; and
    displaying, by the mobile reader, the data transmitted by the object information service server.

2. The method of claim 1, wherein the encrypting the item ID includes:
    performing a hash operation based on a tag key, hash function, and authentication value ($C_i$), and generating a keyed hash $h_k(C_i)$ in response; and
    performing an exclusive-OR operation on the item ID and the keyed hash $h_k(C_i)$.

3. The method of claim 1, wherein the object information server stores information associated with Electronic Product Code (EPC).

4. A pre-purchase item information provision system comprising:
    an object information service server;
    a local server operatively coupled to the object information service server, the local server being configured to transmit a certificate containing information on a location of the object information service server and an authentication value;
    a mobile reader configured to receive from the local server the certificate containing the information on the location of the object information service server and the authentication value, the mobile reader being further configured to transmit a query for requesting an item ID uniquely identifying a specific item in response to a user command, the query including the authentication value; and
    a tag means coupled to the specific item and storing the item ID of the specific item, the tag means being configured to receive the query from the mobile reader, encrypt the item ID based on the authentication value transmitted in the query, and transmit the encrypted item ID,
    wherein, the object information service server is configured to receive from the mobile reader the encrypted item ID and the authentication value, determine whether the authentication value transmitted by the mobile reader exists in a database accessible to the object information service server, retrieve data associated with the specific item in response to determining that the authentication value exists in the database, and transmit the retrieved data to the mobile reader for display.

5. The method of claim 2, wherein the tag key is a value associated with the tag.

6. The method of claim 5, wherein the tag key is stored in the mobile reader.

7. The method of claim 2 further comprising:
    obtaining by the object information service server the item ID of the target item based on the key value, the encrypted item ID, and the authentication value.

8. The method of claim 1, wherein the local server stores a corresponding authentication value for each of a plurality of target items available for purchase.

9. The method of claim 1, wherein the local server is remotely located from the object information service server.

10. The method of claim 1, wherein the item ID uniquely identifying the target item is an electronic product code of the target item.

11. The method of claim 1, wherein the data retrieved by the object information service server in response to determining that the authentication value exists in the database, is product information of the target item.

12. The method of claim 7, wherein the obtaining the item ID includes performing an exclusive-OR operation on the encrypted item ID and the keyed hash $h_k(C_i)$.

* * * * *